United States Patent [19]

Meier et al.

[11] Patent Number: 4,739,609

[45] Date of Patent: Apr. 26, 1988

[54] DEVICE FOR MOWING AND CONDITIONING HAY

[75] Inventors: Hubert Meier, Gottmadingen; Hans Singer, Steisslengen, both of Fed. Rep. of Germany

[73] Assignee: Kloeckner-Humboldt-Deutz AG, Fed. Rep. of Germany

[21] Appl. No.: 893,622

[22] Filed: Aug. 6, 1986

[30] Foreign Application Priority Data

Aug. 7, 1985 [DE] Fed. Rep. of Germany ....... 3528372

[51] Int. Cl.⁴ ..................... A01D 43/10; A01D 82/00
[52] U.S. Cl. .................. 56/192; 56/DIG. 1; 56/16.4
[58] Field of Search .................. 56/DIG. 1, 16.4, 192, 56/6, 13.6

[56] References Cited

U.S. PATENT DOCUMENTS

| | | | |
|---|---|---|---|
| 3,139,717 | 7/1964 | Fischer | 56/DIG. 1 |
| 3,233,395 | 2/1966 | Dahl et al. | 56/192 |
| 4,182,099 | 1/1980 | Davis et al. | 56/16.4 |
| 4,267,688 | 5/1981 | Vissers et al. | 56/16.4 |
| 4,330,982 | 5/1982 | Vissers et al. | 56/192 |
| 4,499,712 | 2/1985 | Klinner | 56/16.4 |

FOREIGN PATENT DOCUMENTS

| | | | |
|---|---|---|---|
| 2131134 | 8/1973 | Fed. Rep. of Germany | 56/DIG. 1 |
| 2364657 | 4/1975 | Fed. Rep. of Germany | 56/DIG. 1 |
| 2459007 | 6/1976 | Fed. Rep. of Germany | 56/DIG. 1 |
| 1582410 | 12/1977 | Fed. Rep. of Germany | 56/DIG. 1 |

*Primary Examiner*—John Weiss
*Attorney, Agent, or Firm*—Charles L. Schwab

[57] ABSTRACT

The device for mowing and conditioning crops including a plurality of juxtaposed mowing rotors and a conditioner rotatably arranged around a horizontal axis immediately behind and extending substantially across the width of the mowing rotors. The conditioner includes a shaft with left and right pitched auger flights which join at approximately the longitudinal center of the shaft so that the cut hay is directed into a single narrow swath in the center behind the conditioner. Conditioning tools are secured along the outer edge of the auger flights and the conditioner is rotated in a direction causing an overshot movement of the hay from the mowing rotors.

15 Claims, 4 Drawing Sheets

DEVICE FOR MOWING AND CONDITIONING HAY

TECHNICAL FIELD

This invention relates to a device for mowing and conditioning hay, consisting of a plurality of juxtaposed mowing rotors and a conditioner structure rotatably arranged around a horizontal axle immediately behind it essentially extending across the entire width of the mowing rotors, the rotational direction of which results in an overshot conveyance of the crop material.

PRIOR ART STATEMENT

Various mowers have heretofore been provided with a conditioner for striking the crop material after it has been mowed thereby accelerating the drying process. Such a conditioning machine for agricultural crops, which consists of a material conveying mechanism having a conveying drum, is known, for example, from West German patent DE-AS No. 21 31 134. The conveying drum together with a guide barrier creates a conveying channel which has baffles arranged at its sides in order to treat the conveyed crop material The blunt baffles are retractably supported and are laterally spaced from one another so as to be positioned in the spaces between the conveying implements of the conveying drum. If the mowed material is prepared by the impact drums which possess tines or strikers with which the mowed hay is picked up either above or behind the mowing device and advanced to the conditioning device, then most of the hay is aligned in a longitudinal direction such that the stalks are not efficiently engaged by the conditioning implements and often pass between the tines or strikers without being conditioned.

Other conditioning mechanisms are known in which the hay is directed by means of transverse conveying parts into a narrow width and as a result can be subjected to a relatively small treatment mechanism, for example, a pair of bending or compression rollers. However, the hay passes in an unevenly aligned manner to the entrance gap between the pair of bending rollers in a thick prepressed strand, thereby the layers of hay in the center of the strand are not engaged by the conditioning rollers and as a result, the conditioning process is not uniform.

In West German patent DE-AS No. 23 64 657, a rotary conditioning device is disclosed which includes a free-cutting rotary mowing unit and a drum situated immediately behind it transverse to the direction of the material flow and which extends nearly across the entire mowing width. Flexible tines or articulated strikers are attached to the rotatable drum which are spaced from one another and extend vertically outward in relation to the drum axle. A hold-down device is positioned in front and above the cutting area of the rotating mowing unit so as to exert a force downward. The hold-down device is shaped in the form of an auger and performs like a drum-shaped conveyor with a downward rotational direction on the front side.

With this known mowing machine, the crop while still anchored by its roots is tipped by the flight of the auger transverse to the direction of the material flow and after being cut off, is supplied to the conditioning mechanism in a transverse position. Such construction is, however, inconvenient, complicated and expensive.

OBJECTS AND SUMMARY OF THE INVENTION

An object of this invention is the provision of a mowing and conditioning unit for hay which is less expensive and simpler in construction and which nevertheless conditions the hay in a more intensive and thorough manner.

In contrast to the mower and conditioner units of the prior art, the conditioning mechanism of the present invention uses a shaft with left and right moving auger flights or blades which come together at approximately the center of the shaft, or overlap each other, so that the cut hay is directed into a single narrow swath in the center behind the shaft, together with conditioning tools on the outer edges of the auger blades.

The pitch of the auger units may be the same as or greater than the diameter of the circular path of the conditioning mechanism thereby maintaining efficient swath formation. The shaft may be advantageously arranged in such a manner relative to the mowing rotors that the tangent line drawn at the front edge of the auger units with respect to the mowing rotor runs approximately through the rotating axis of the mowing rotor. For efficient pick up of the cut crop material, the conditioner mechanism with its tools is attached in such a manner that the gap between the lower edge of the circular path of the tools and the mowing rotors is between 15 and 100 millimeters.

The conditioner shaft itself may be removably supported on the conditioner frame in flanged bearings with key or pin fasteners and the conditioner tools can be equipped with fixed saw teeth or tines or movably supported striking tools such as wedge shaped strikers supported in an articulated fashion.

In one embodiment of the invention, two double flighted opposing auger units make up the auger with gaps provided between the tools connected to the periphery of the auger flights whereby the part of the one auger which has no tools attached at one transverse location on the auger overlaps the part provided with tools on the other auger. It is believed that a hay conditioner so equipped will have greater capacity for transverse conveyance of the crop material.

The conditioner unit is covered by a guide chute on the underside of which guide rails are positioned to work in conjunction with the conditioner tools. The rear part of the guide chute may be swung open.

For intensive processing of the crop material, a transversely extending adjustable impact edge may be attached so as to cooperate with the conditioner tools to condition the hay. A better positioning of the swath results if the guide chute is provided with laterally spaced and downwardly extending metal guide plates which converge rearwardly.

A particularly simple drive results if the conditioner shaft can be propelled by means of a miter gear box which has a flanged connection to a main miter gear box. Between the output shaft of the attached miter gear box and an extension on one end of the auger shaft, a V-belt drive with exchangeable pulleys or a variable pitch V-belt drive can be arranged for an improved match of various mowing requirements.

The conditioner of this invention features the advantage of intensively functioning conditioner tools. The conditioner tools provided on the outer edge of the auger blades have a relatively small radial clearance from the auger edge and are arranged in such a fashion that the advantage of a smooth surface on the front side of the auger blade is maintained. Since the conditioner tools match the auger pitch, a greater relative movement results between the mowed hay and the tools than with respect to the auger blade, so that the hay is processed more intensively and simultaneously advanced in an axial direction.

This axial advancement serves to direct the hay over a relatively short distance, as compared to the direction of the tractor movement, and into a small swath. Because the rear part of the guide chute can be swung downwardly, an unhindered movement into the three-point quick hitch of the tractor is facilitated. The front part of the protective mower cover can be swung open in order to reduce the overall length of the vehicle. Because of the position of the conditioner shaft with respect to the mower rotors, an efficient lifting of the mowed hay is achieved by the tools on the conditioner auger.

The arrangement of the conditioner shaft on flanged bearings with key fasteners permits an advantageous rapid exchange of various types of conditioners in the event the hay is not properly conditioned. For example, with daily retrieval of fresh feed, a conditioner with a smooth auger can be installed, which creates a narrow swath straddled by the tractor wheels.

This invention provides a conditioner with relatively small diameter augers which results in a slower speed and increased conditioning efficiency. This invention is especially suited for front end mowing operations with narrow mounting space, however, it can also be advantageously used in other mowing units.

DETAILED DESCRIPTION OF THE DRAWINGS

Figure 1:
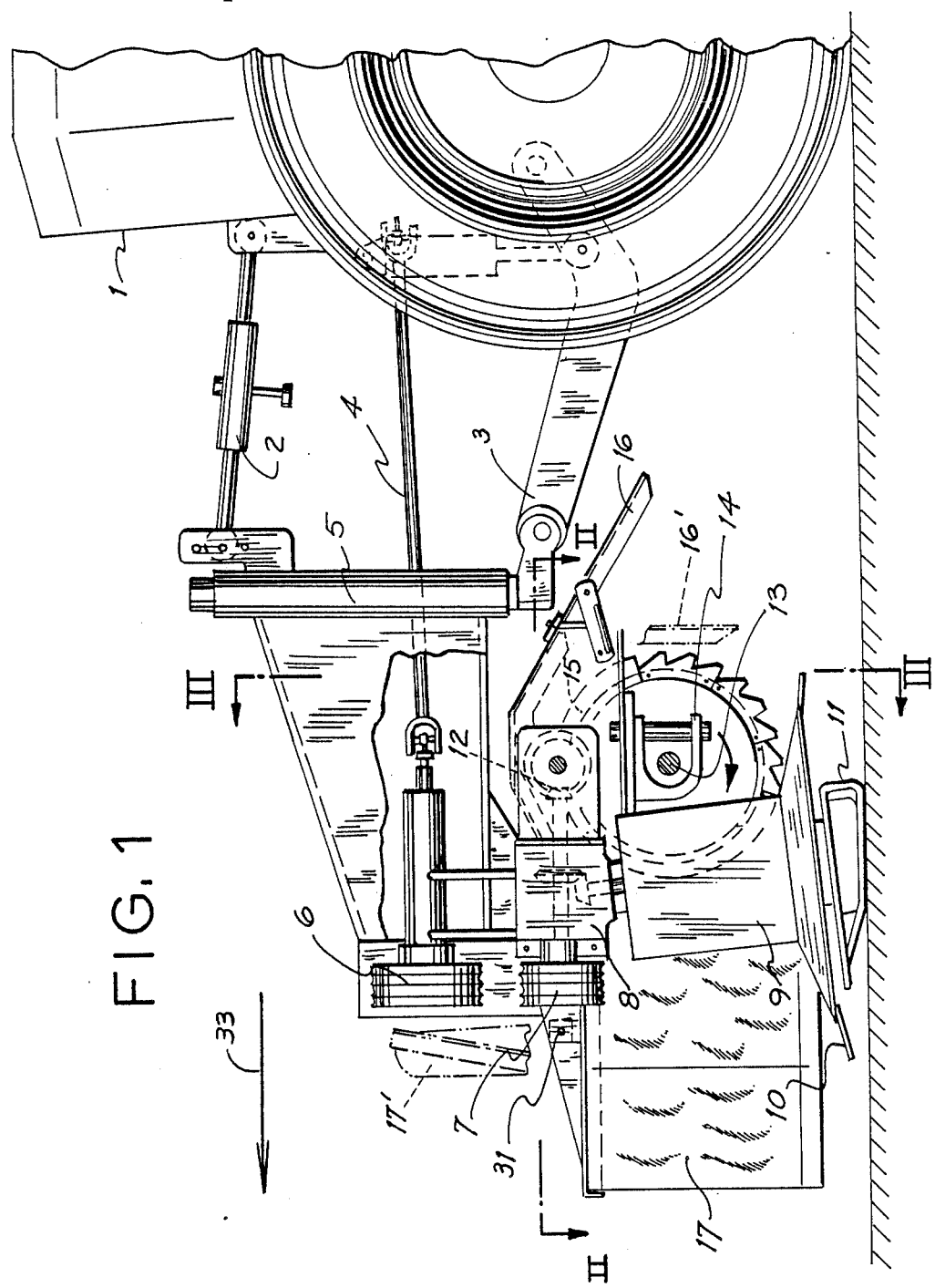
FIG. 1 is a side view of a mowing and conditioning machine incorporating the invention.

Referring to FIG. 1, the front part of a tractor 1 is provided with a three-point quick hitch frame having upper and lower links 2, 3 to which a coupling frame 5 of the mower and conditioner machine of this invention is releasably connected. The tractor 1 is driven forwardly in the direction of the arrow 33 during operation of the illustrated mowing and conditioning machine. In a conventional manner, the mowing structure includes a plurality of juxtaposed mowing rotors 9, 9', 9" on the lower end of which rotating cutting implements 10 are provided. The mower structure is supported on the ground by guide shoes 11. The mower structure is protected on all sides by a protective enclosure 17 and is driven by means of a main miter gear box 8 which in turn is driven by the tractor 1 by means of a drive shaft 4. As FIG. 1 shows, the drive shaft 4 drives a first belt pulley 6 which is connected to a second belt pulley 7 by means of a set of drive belts, not shown. The belt pulley 7 drives the main miter gear box 8 which in turn drives the individual mowing rotors 9, 9' . . . . A secondary miter gear box 12 is secured by flanges to the main miter gear box 8 and is driven by the latter. Immediately behind the mowing rotors 9, 9' . . . a conditioner is provided which rotates about a horizontal transverse axis and extends substantially across the entire lateral width occupied by the mowing rotors 9, 9' . . . . The conditioner includes a shaft 13 on which left and right pitched auger flights or blades 18, 20 are secured. The conditioner is covered by a guide chute 15, the rear end 16 of which can be swung downwardly to a position shown by broken lines 16' thereby facilitating the coupling of the mowing and conditioning machine onto the tractor 1. The front part of the enclosure 17 is hinged on a transverse axis 31 for upward swinging movement to a raised position shown by broken lines 17', thereby reducing the fore and aft dimension of the mower and conditioner machine.

Figure 2:
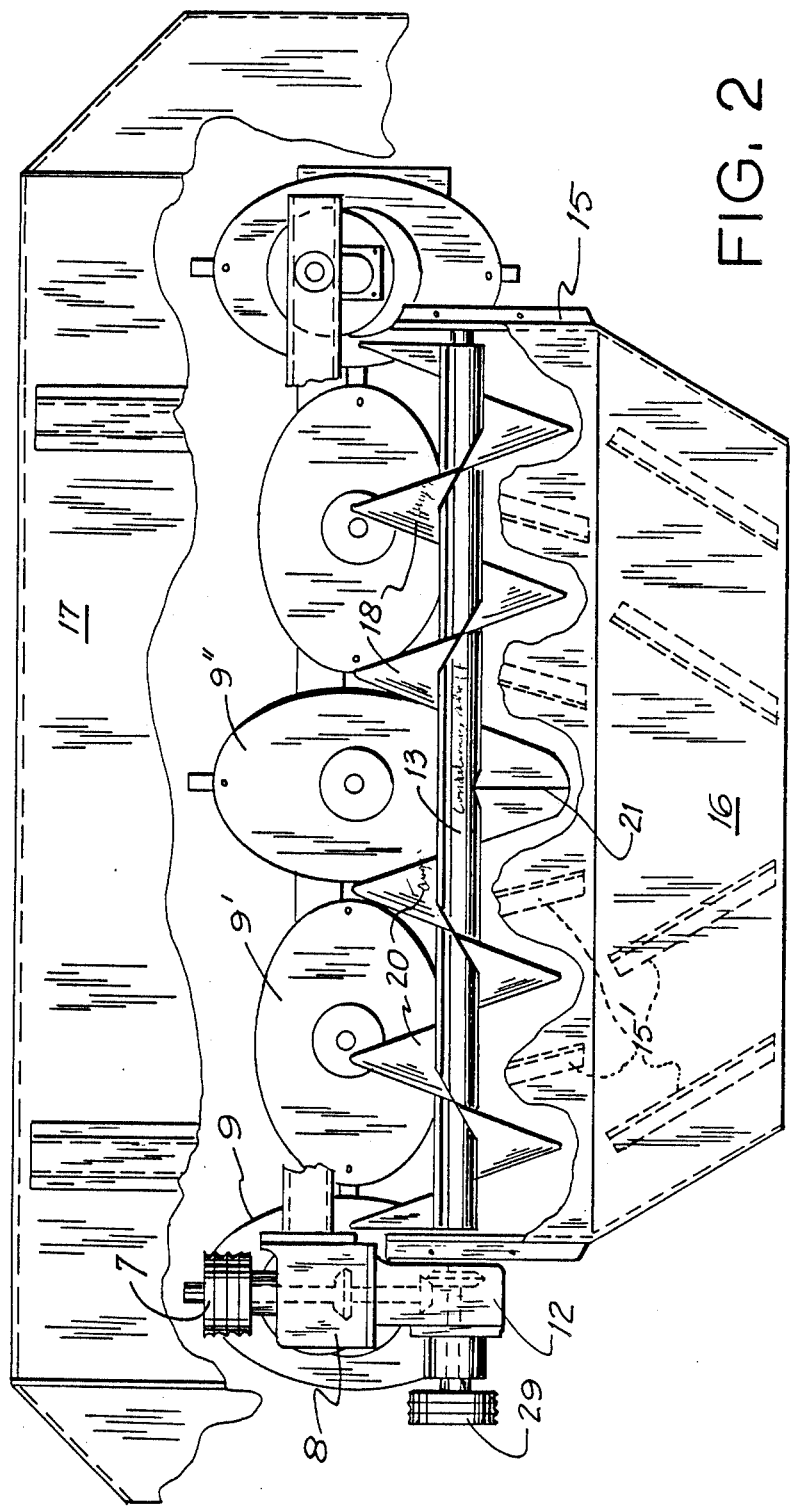
FIG. 2 is a section along line II—II of FIG. 1.

Referring also to FIG. 2, the oppositely pitched auger units 18 and 20 are arranged on the conditioner shaft 13 in such a manner that the auger units meet at 21 which is at about the midpoint of the length of the shaft 13. The shaft 13 is driven by means of a miter gear box 12, which is attached by its flanges to the main miter gear box 8. A belt pulley 29 on the output shaft of the miter gear box 12 and a belt pulley 30 on the end of the shaft 13 of the conditioner can be replaced with different size pulleys thereby permitting the rotational speed of the shaft 13 to be varied. The pulleys 29, 30 may also be replaced with variable pitch sheaves.

The shaft 13 is positioned in such a manner with respect to the mowing rotors 9, 9', 9" that the axes of mowing rotors are approximately tangential to the front edge of the auger units. The lower portion of the circular contour or path of the conditioning tools preferably has a clearance of 15 to 100 millimeters with respect to the mowing rotors.

Figure 3:
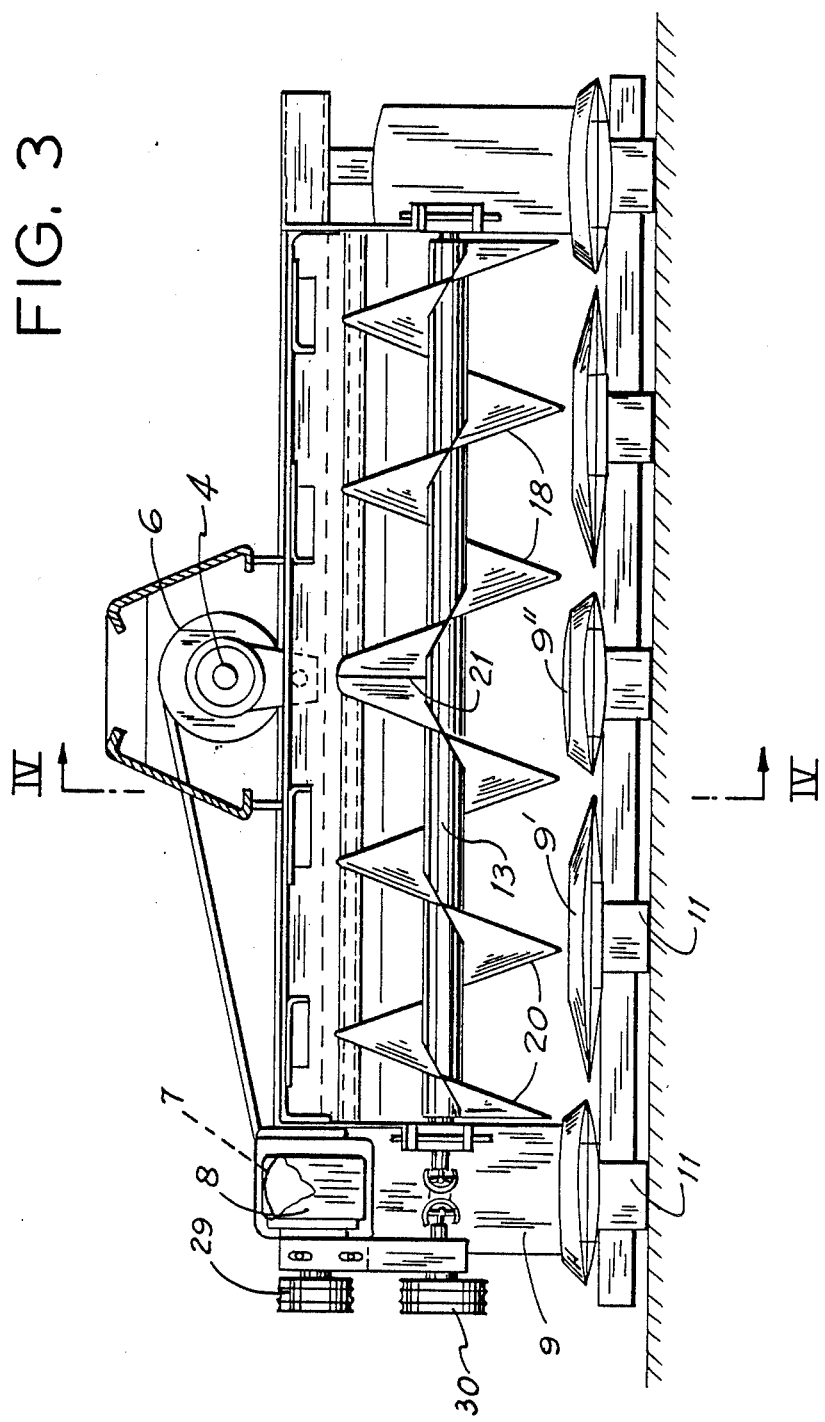
FIG. 3 is a section along the line III—III of FIG. 1.
Figure 4:
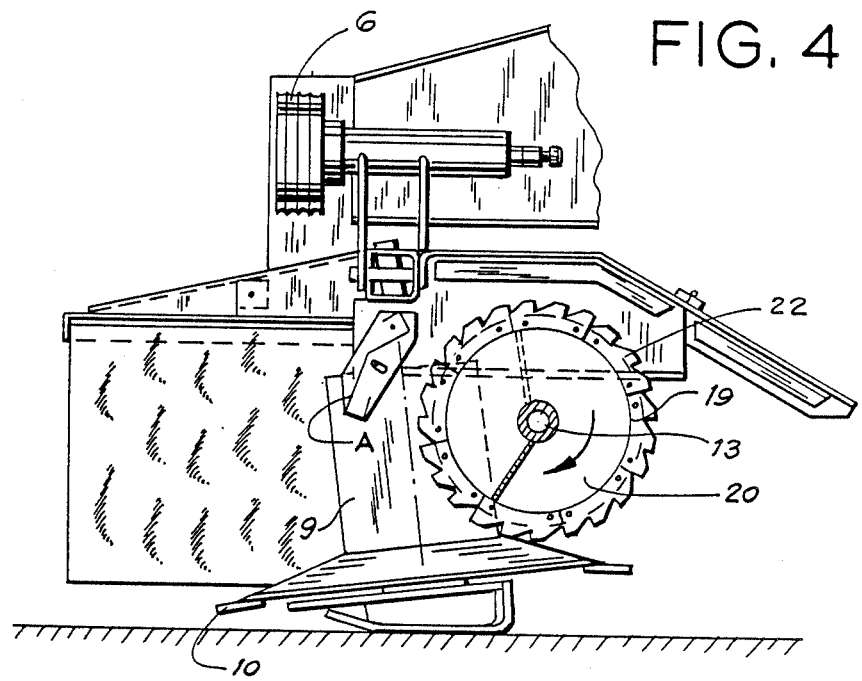
FIG. 4 is a section along the line IV—IV in FIG. 3.
Figure 5:
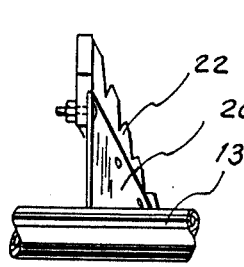
FIGS. 5 through 7 show various conditioner tools.

As shown in FIGS. 1 and 3, the shaft 13 is supported at its opposite ends by flanged bearings 14, which are releasably secured in place on the frame of the mower/conditioner by means of key fasteners, whereby rapid installation and removal is possible as well as the replacement by different auger blade units. According to the invention, the outer edge of the auger blades on both auger units 18, 20 are provided with conditioning tools which can be of various shapes and can be made of different materials. FIGS. 1, 4 and 5, for example, show saw tooth conditioning tool sections attached to the radially outer edge of the blades and form a smooth radially outward continuation of the hay engaging face of the auger blades.

Referring to FIG. 4, the outer circumference of the auger flight or blade 20 is trimmed with saw tooth shaped conditioner tool sections 22. As FIG. 5 shows, the conditioner tool sections 22 can be securely fastened to the circumference 19 of the auger flight 20 by screws.

A transversely disposed and adjustable impact edge A is positioned forwardly of the conditioner and in conjunction with the conditioning tools, contributes to the conditioning of the hay.

Figure 6:
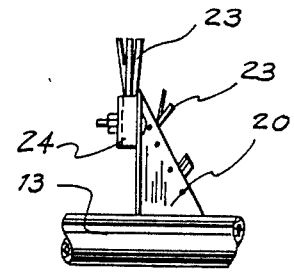

As shown in FIG. 6, single or multiple flexible bristle units 23 can be secured to the auger flight 20 at a distance from each other by a fastener 24.

Figure 7:
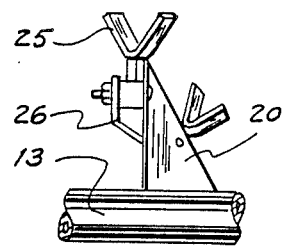

As shown in FIG. 7, it is also possible to trim the auger flight 20 with pivoted or swinging conditioning tools 25, for example, in the shape of wedge shaped strikers, by means of a mounting device 26, permitting swinging movement relative to the flight 20.

Figure 8:
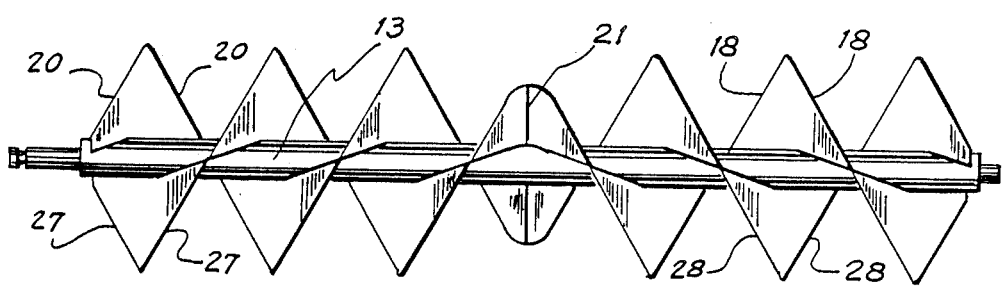
FIG. 8 is a front view of a double flighted conditioner unit.

FIG. 8 shows another embodiment of a suitable conditioner with multiple auger flights 20, 27 and 18, 28 which also are opposingly pitched and join or overlap each other at approximately the longitudinal center of the shaft 13 at position 21. Conditioning tools may be attached at spaced intervals to the edges of the double flights 20, 27 and 18, 28 in such a manner that the gaps between the tools on one of the double flights is longitudinally aligned with a tool on the other of the double flights.

As shown in FIGS. 1, 2 and 3, rearwardly converging guide rails are secured to the underside of the guide chute 15 and its rearwardly disposed and downwardly pivotable extension 16. The angle shaped guide rails 15' cooperate with the flights 18, 20 of the conditioner to create improved swath formation of the cut and conditioned hay.

This invention provides a machine for mowing and conditioning hay which is simple in construction and functions efficiently. This invention permits use of conditioners having smaller diameters and lower drive speed which results in especially high conditioning efficiency.

The embodiments of the invention in which an exclusive property or privilege is claimed are defined as follows:

1. A machine for mowing and conditioning hay including a plurality of juxtaposed mowing rotors and a conditioner rotatably disposed on a horizontal axis immediately behind said mowing rotors and extending substantially across the entire width of the moving rotors, said conditioner rotating in a direction causing overshot movement of the hay cut by the mowing rotors and a having a shaft with left and right pitched auger flights which join each other at approximately the longitudinal center of said shaft whereby the hay is directed into a single narrow central swath behind the conditioner and conditioning tools secured along the outer edge of said auger flights.

2. The machine of claim 1 wherein the pitch of said auger flights is at least equal to the diameter of the circular contour of said conditioner.

3. The machine of claim 1 wherein the axes of said mowing rotors are approximately tangential to the front edge of said auger flights.

4. The machine of claim 1 wherein the clearance between the circular contour of the conditioning tools and the mowing rotors is within a range of 15 to 100 millimeters.

5. The machine of claim 1 and further comprising bearings rotatably supporting said shaft and support means removably supporting said bearings on said machine.

6. The machine of claim 1 wherein said conditioning tools include segments presenting fixed teeth.

7. The machine of claim 1 wherein said conditioning tools include a plurality of spaced elastic bristle units.

8. The machine of claim 1 wherein said conditioning tools include movably supported striking tools.

9. The machine of claim 8 wherein striking tools are pivotally supported wedge-shaped strikers.

10. The machine of claim 1 and further comprising a guide chute covering said conditioner and presenting rearwardly converging guide rails on its underside in cooperative relation to said conditioner tools to effect conditioning of the hay.

11. The machine of claim 10 and further comprising a tranversely extending adjustable impact edge at the front of said guide chute and operable in conjunction with said conditioning tools to enhance conditioning of the hay.

12. The machine of claim 10 wherein the rearmost part of said guide chute can be swung between a rearwardly extending position and a downwardly extending position and including rearwardly converging guide rails on its underside which are disposed rearwardly of said conditioner.

13. A machine of claim 1 and further comprising a main miter gear box driving said mowing rotors and a secondary gear box secured to said main miter gear box and having an output shaft connected in driving relation to said conditioner.

14. The machine of claim 13 wherein said secondary miter gear box is drivingly connected to said conditioner by a variable speed drive.

15. The machine of claim 14 wherein said variable speed drive includes exchangeable pulleys on the output shaft of said secondary miter gear box and on the end of said shaft of said conditioner, respectively.

* * * * *